United States Patent
Peka

(10) Patent No.: US 7,218,061 B2
(45) Date of Patent: May 15, 2007

(54) CIRCUIT ARRANGEMENT FOR PRODUCING A CONTROL SIGNAL FOR THE PURPOSE OF DIMMING AT LEAST ONE LAMP

(75) Inventor: Petr Peka, Traunreut (DE)

(73) Assignee: Patent-Treuhand-Gesellschaft Fur Elektrisch Gluhlampen MBH (DE)

( * ) Notice: Subject to any disclaimer, the term of this patent is extended or adjusted under 35 U.S.C. 154(b) by 0 days.

(21) Appl. No.: 11/204,053

(22) Filed: Aug. 16, 2005

(65) Prior Publication Data

US 2006/0043907 A1    Mar. 2, 2006

(30) Foreign Application Priority Data

Sep. 2, 2004 (DE) ...................... 10 2004 042 587

(51) Int. Cl.
*H05B 41/36* (2006.01)
(52) U.S. Cl. .................. 315/224; 315/209 R; 315/291; 315/307; 315/DIG. 4
(58) Field of Classification Search ........... 315/246, 315/209 R, 291, 307, DIG. 4, DIG. 7, 224, 315/225
See application file for complete search history.

(56) References Cited

U.S. PATENT DOCUMENTS

| 6,448,713 | B1 * | 9/2002 | Farkas et al. | 315/291 |
| 6,545,431 | B2 * | 4/2003 | Hui et al. | 315/291 |
| 6,597,127 | B2 * | 7/2003 | Takahashi et al. | 315/224 |
| 6,603,274 | B2 * | 8/2003 | Ribarich et al. | 315/291 |
| 7,075,251 | B2 * | 7/2006 | Chen et al. | 315/291 |

* cited by examiner

*Primary Examiner*—Tuyet Vo
*Assistant Examiner*—Ephrem Alemu
(74) *Attorney, Agent, or Firm*—Fitch, Even, Tabin & Flannery

(57) ABSTRACT

A circuit arrangement for producing a control signal ($U_s$) for the purpose of dimming at least one lamp, including a device (10) for modifying the phase gating angle corresponding to a dimming input value (8), it being possible for the device (10) for modifying the phase gating angle to be fed, at its input, an input signal ($U_e$), whose phase gating angle is to be modified, and for an output signal (U1) having a modified phase gating angle to be provided at its output; and an output at which the control signal ($U_s$) can be provided; it also includes a device (14) for comparing the output signal (U1) with a predeterminable signal ($U_c$) for the purpose of producing the control signal ($U_s$), the amplitude of the predeterminable signal ($U_c$) depending on the amplitude of the input signal ($U_e$).

8 Claims, 6 Drawing Sheets

−PRIOR ART−

−PRIOR ART−

CIRCUIT ARRANGEMENT FOR PRODUCING A CONTROL SIGNAL FOR THE PURPOSE OF DIMMING AT LEAST ONE LAMP

FIELD OF THE INVENTION

The present invention relates to a circuit arrangement for producing a control signal for the purpose of dimming at least one lamp, comprising a device for modifying the phase gating angle corresponding to a dimming input value, it being possible for the device for modifying the phase gating angle to be fed, at its input, an input signal, whose phase gating angle is to be modified, and for an output signal having a modified phase gating angle to be provided at its output, and an output at which the control signal can be provided. It also relates to a method for producing a control signal for the purpose of dimming at least one lamp, comprising the steps of providing an input signal and of modifying the phase gating angle of the input signal corresponding to a dimming input value.

BACKGROUND OF THE INVENTION

Such a circuit arrangement and such a method are known from the prior art, cf. in this regard FIGS. 1 to 3b which will be explained in more detail below for the purpose of introducing the problems on which the invention is based and in which:

FIG. 1 shows a circuit arrangement in which a device 10 for modifying the phase gating angle of an input voltage $U_e$, in particular a sinusoidal AC voltage, for example a system voltage, corresponding to a dimming input value 8 is provided at the input. Said circuit arrangement provides a voltage U1 having a modified phase gating angle at its output. The voltage U1 is fed to a rectifier circuit comprising the four diodes D1 to D4. The voltage $U_g$ can be tapped off at a resistor $R_g$. The voltage $U_s$, which is derived from the voltage $U_g$ across a voltage divider, which comprises the resistors R1 and R2, and an averaging unit, to which the resistor R2 likewise contributes in addition to a capacitor C1, is made available as the control signal at the output of the circuit arrangement.

This control voltage is now made available to an electronic ballast (not shown) to which the lamp to be dimmed is coupled. The problems associated with this circuit are explained with reference to FIGS. 2 and 3:

FIG. 2a shows the waveform of the voltage $U_g$ for different voltages, in particular system voltages, applied at the input of the device for modifying the phase gating angle given an identical dimming input value 8, i.e. both times for a phase gating angle φ of 20°. In FIG. 2a, the voltage $U_{gh}$ corresponds to a system voltage of 277 V, and the voltage $U_{g1}$ corresponds to a system voltage of 120 V. The control voltages $U_{sh}$ and $U_{s1}$ which correspond thereto are illustrated in FIG. 2b. It can be seen that, despite an identical dimming input value 8, the present circuit arrangement for producing a control signal for the purpose of dimming at least one lamp provides very different control voltages at the electronic ballast which is coupled to the lamp, depending on the input voltage.

FIG. 3a shows the voltage $U_g$ for different phase angles φ, the system voltage being 120 V. The voltage $U_{g1}$ corresponds to a phase angle φ of 20°, while the voltage $U_{g2}$ corresponds to a phase angle φ of 120°. FIG. 3b shows the control voltages $U_{s1}$ and $U_{s2}$ corresponding thereto.

As a result, such a circuit arrangement as illustrated in FIG. 1 is not suitable for operation using different input voltages, in particular system voltages, to be applied to the device for modifying the phase gating angle since the control signal $U_s$ provided at the output of the circuit arrangement depends on the input voltage applied to the device for modifying the phase gating angle. At an input voltage of 277 V, the value range for the control voltage is approximately 1 V to 3 V, while at an input voltage of 230 V, a value range for the control voltage of approximately 0.5 V to 1.7 V results.

SUMMARY OF THE INVENTION

The present invention is based on the object of developing a circuit arrangement of the type mentioned initially and the method mentioned initially such that use at different system voltages is made possible.

The present invention is based on the knowledge that the object can be achieved by the output signal being compared with a predeterminable signal for the purpose of producing the control signal, the amplitude of the predeterminable signal depending on the amplitude of the input signal.

As a result of the fact that the system voltage can be taken into account in the comparison, and that there is virtually a comparison between two signals derived from the system voltage, the influence of the system voltage can be eliminated such that the single remaining dependence in the control signal $U_s$ is the dependence on the phase gating angle. It is thus possible for one and the same circuit arrangement to be used both in the USA and in Europe, for example.

A particularly preferred embodiment is characterized in that the comparison device comprises a toggle circuit. This makes it possible for a control signal $U_s$ to be provided at the output of the comparison device, and this control signal $U_s$ is pulse width modulated as a function of the phase gating angle.

A rectifier circuit is preferably provided upstream or downstream of the modification device. This has the advantage that it is only necessary to use a unipolar signal in the comparison device, which results in a simplification of the circuit arrangement and thus in a reduction of the circuitry complexity.

The circuit arrangement according to the invention preferably also has an amplitude detection device for the purpose of detecting the amplitude of the input signal. In this case, a variable is preferably determined which is correlated with the peak value of the amplitude of the input signal.

The amplitude detection device preferably has a holding element in order to provide the comparison device with the detected amplitude or a variable which has been correlated therewith for a predeterminable period of time. Alternatively, a corresponding holding element may also be provided in the comparison device.

As has already been mentioned, preferred embodiments of the invention are characterized in that they are designed such that a signal, which has been pulse width modulated as a function of the phase gating angle, can be provided at the output of the comparison device.

The comparison device preferably has a current mirror and/or an operational amplifier and/or a transistor.

Further preferred embodiments are described in the sub-claims.

BRIEF DESCRIPTION OF THE DRAWINGS

An exemplary embodiment of the invention will now be described in more detail below with reference to the attached drawings, in which:

FIG. 5b shows the waveform of the control voltages $U_s$ for a circuit arrangement as shown in FIG. 4, corresponding to the voltage waveforms $U_g$ in FIG. 5a;

FIG. 6b shows the waveform of the control voltages $U_s$ for a circuit arrangement as shown in FIG. 4, corresponding to the voltage waveforms $U_g$ in FIG. 6a.

DETAILED DESCRIPTION OF THE INVENTION

In the description of the following exemplary embodiment of the invention, where comparable the same references are used as in the description of the prior art with reference to FIGS. 1 to 3b. Mutually corresponding signals and components are therefore not described again.

Figure 1:
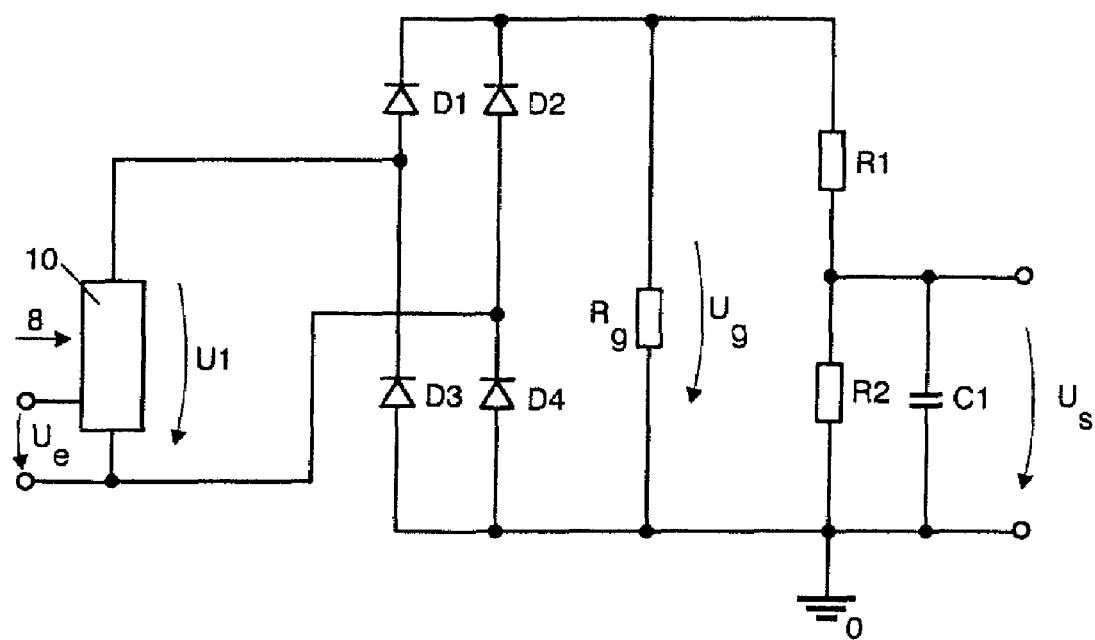
FIG. 1 shows a circuit arrangement known from the prior art for producing a control signal for the purpose of dimming at least one lamp.
Figure 2A:
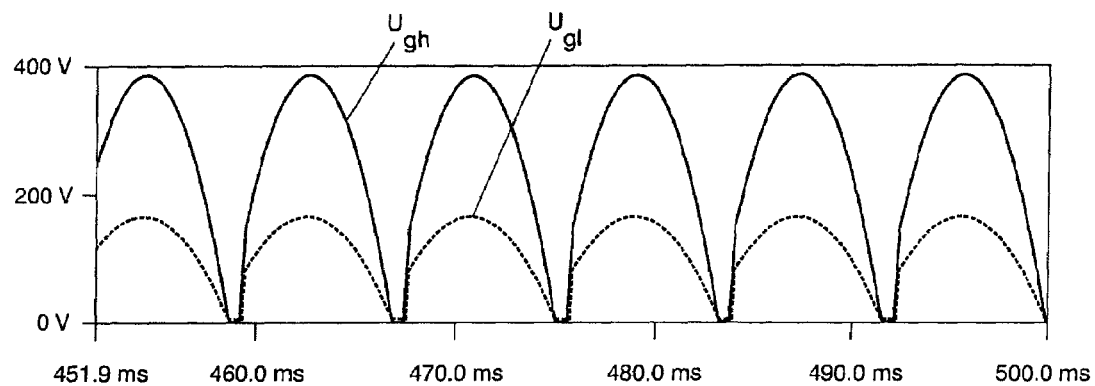
FIG. 2a shows the waveform of the voltage $U_g$ for different input signals.
Figure 2B:
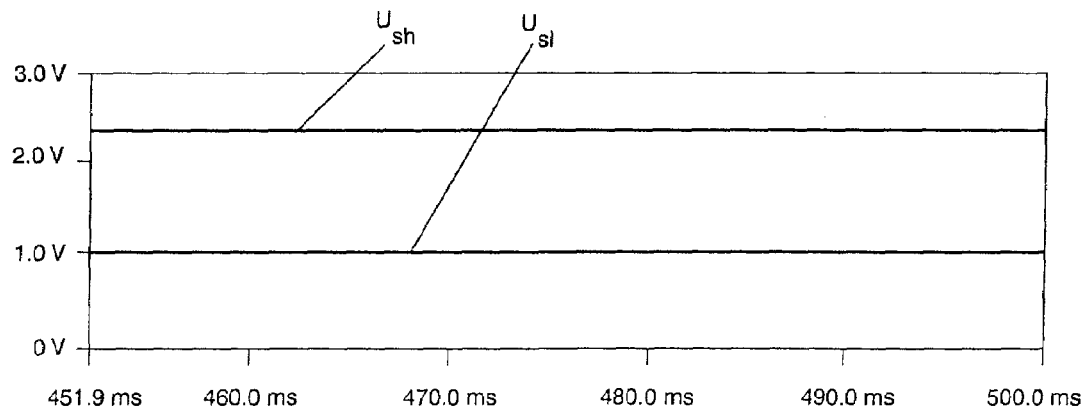
FIG. 2b shows the waveform, corresponding to that in FIG. 2a, of the corresponding control signals at the output of the circuit arrangement in FIG. 1.
Figure 3A:
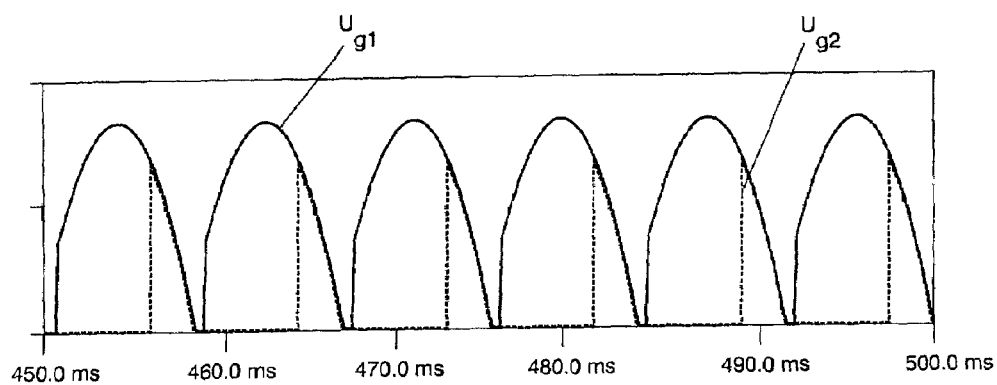
FIG. 3a shows the waveform of the voltage $U_g$ in FIG. 1 for different phase gating angles.
Figure 3B:
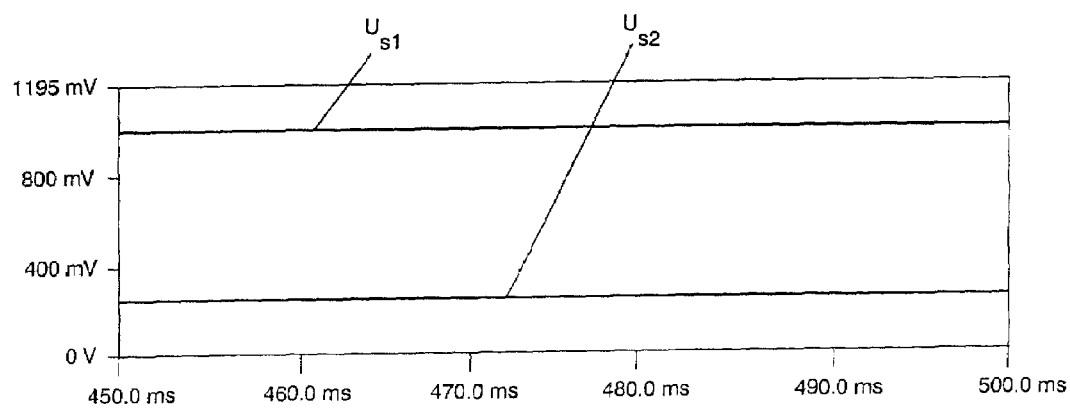
FIG. 3b shows the waveform, corresponding to that in FIG. 3a, of the control signals at the output of the circuit arrangement shown in FIG. 1.
Figure 4:
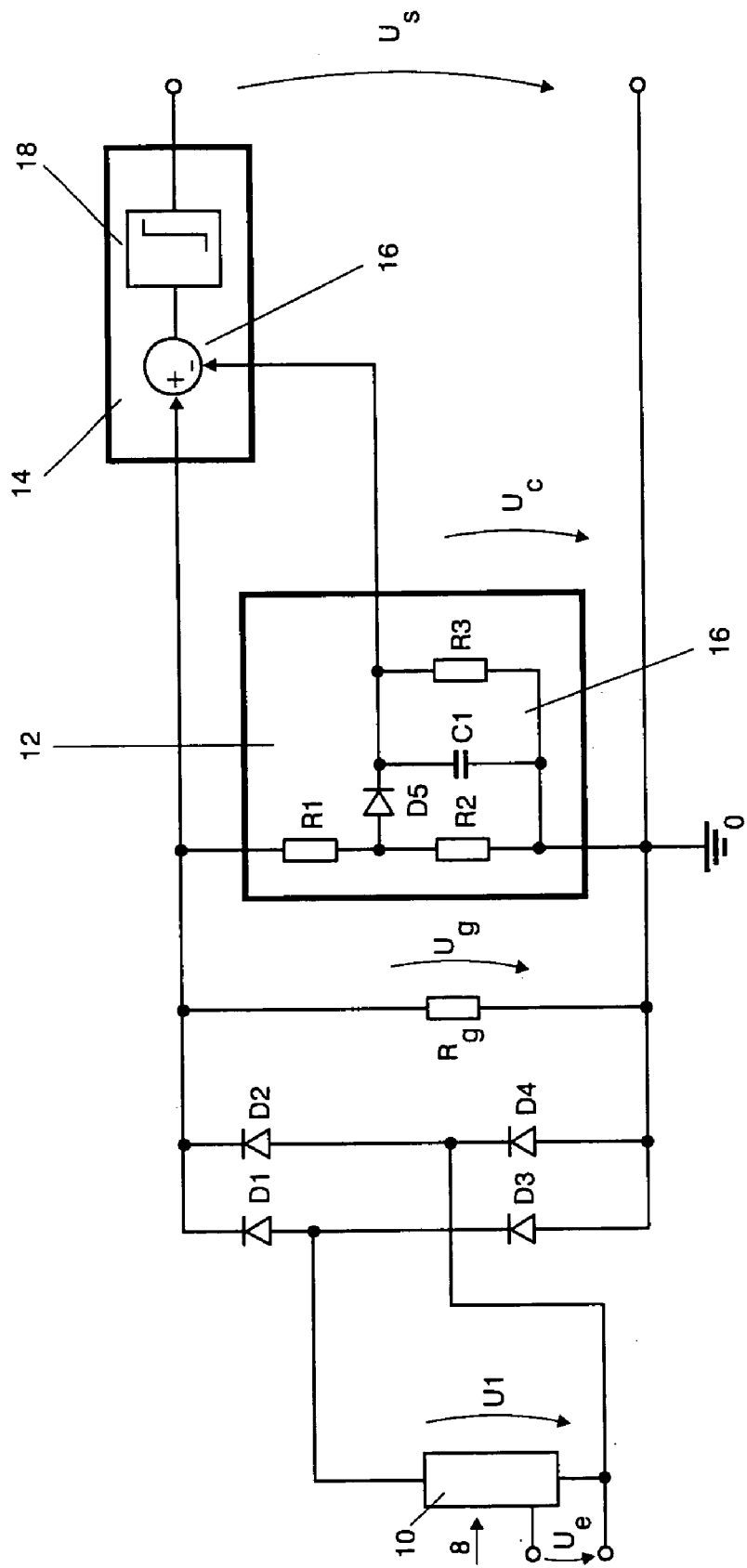
FIG. 4 shows a schematic illustration of the design of a circuit arrangement according to the invention.

FIG. 4 shows a circuit arrangement according to the invention having an amplitude detection device 12 which provides a comparison device 14 with a comparison voltage $U_c$ at its output. The control signal for the purpose of dimming the at least one lamp can be tapped off in the form of the control voltage $U_s$ at the output of the comparison device 14. The amplitude detection device 12 has a voltage divider, which comprises the resistors R1 and R2, as well as a diode D5 and a holding element, which comprises the capacitor C1 and the resistor R3. The comparison device 14 has a subtraction circuit 16 which is connected at its output to a toggle circuit 18. The subtraction circuit 16 forms the difference $U_g$ minus $U_c$. If this difference is positive, the toggle circuit 18 provides a positive voltage having a predeterminable amplitude at its output. If the difference is negative, the toggle circuit 18 provides a voltage having the amplitude 0 V at its output.

Figure 5A:
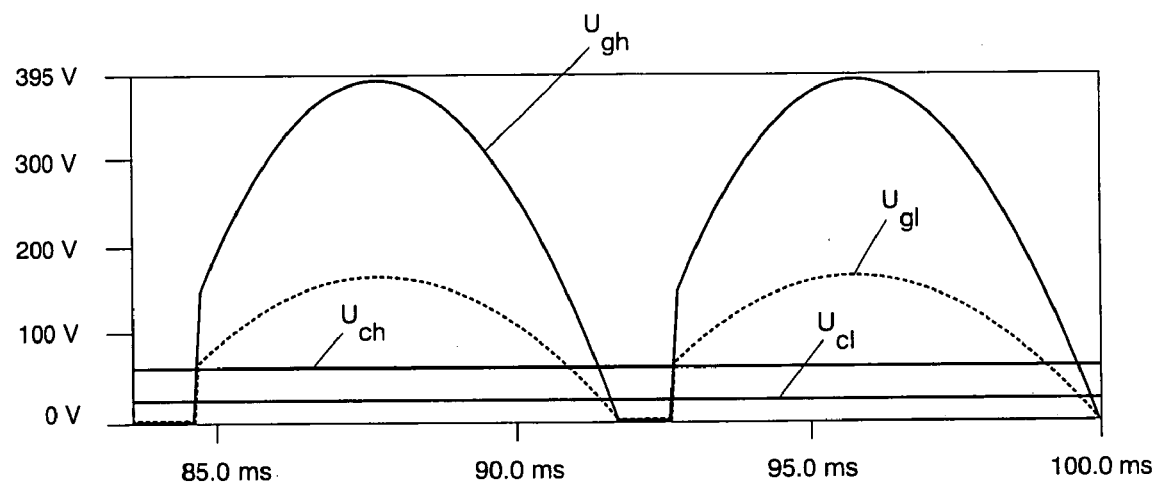
FIG. 5a shows the waveform of the voltage $U_g$ at a phase gating angle φ of 20° for different input voltages and the associated comparison voltages $U_c$.
Figure 5B:
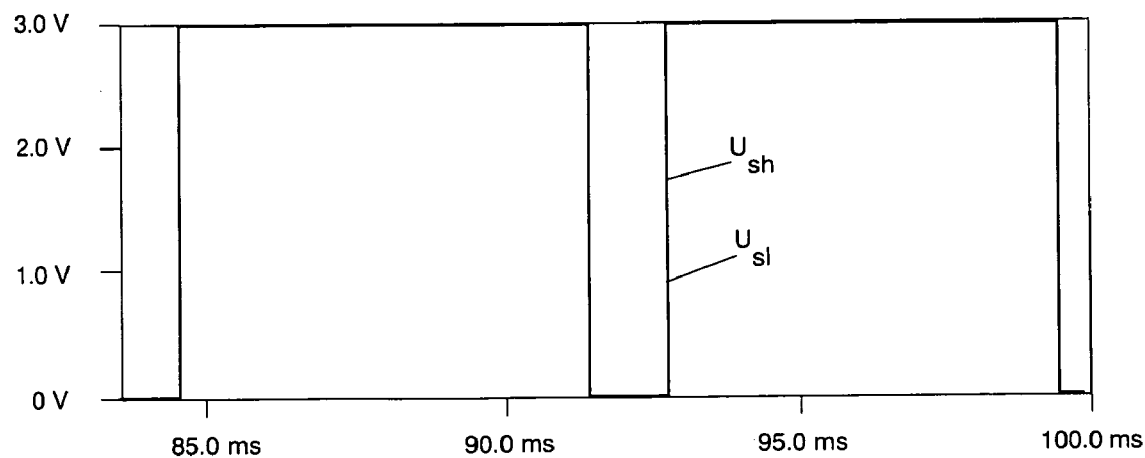

FIG. 5a shows the waveform of the voltage $U_g$ for a phase gating angle φ equal to 20° for an input voltage of 277 V, $U_{gh}$, and for an input voltage of 120 V, $U_{g1}$. Furthermore, FIG. 5a shows the corresponding comparison voltages $U_{ch}$ and $U_{c1}$. In FIG. 5b, the associated waveforms of the corresponding control signals $U_{sh}$ and $U_{s1}$ can be seen, and these waveforms coincide.

Figure 6A:
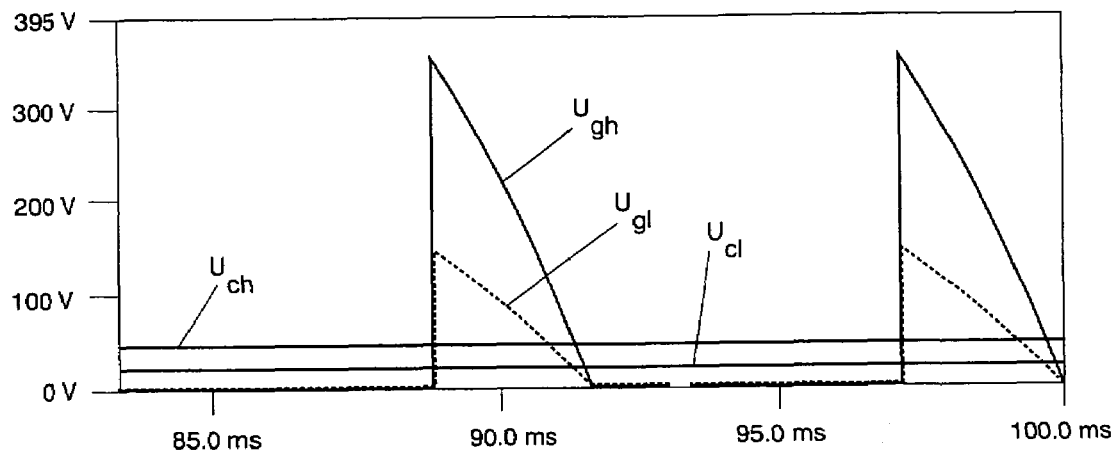
FIG. 6a shows the waveform of the voltage $U_g$ at a phase gating angle φ of 120° for different input voltages and the associated comparison voltages $U_c$.

FIG. 6a shows the waveforms of the voltages $U_{g1}$, $U_{gh}$, $U_{c1}$, $U_{ch}$, cf. FIG. 5a, for a phase gating angle φ equal to 120°.

Figure 6B:
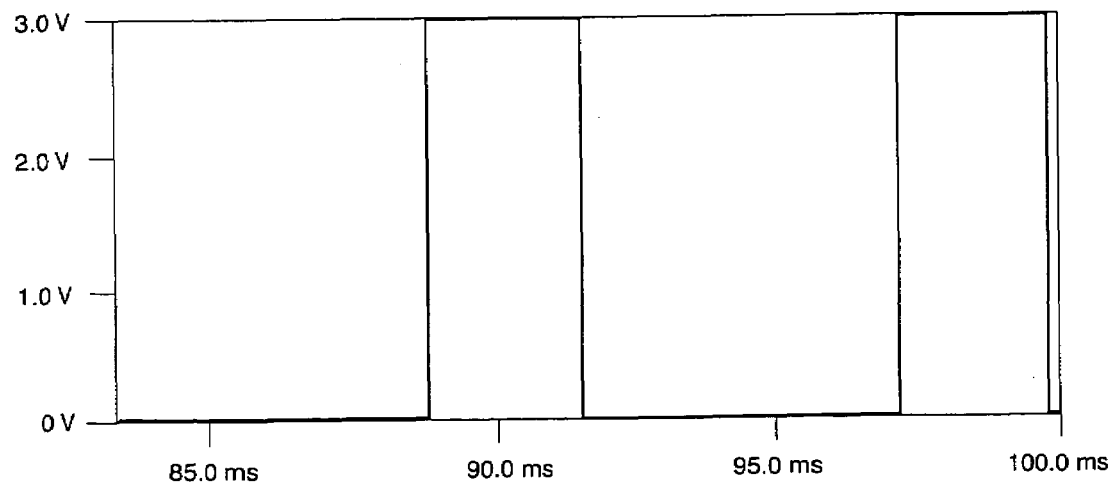

FIG. 6b shows the associated waveforms of the control signals $U_{sh}$ and $U_{s1}$ which in turn coincide.

As a result it remains to be mentioned that the circuit arrangement according to the invention makes it possible to provide a control signal for the purpose of dimming at least one lamp, said control signal depending merely on the phase gating angle and remaining largely uninfluenced by the amplitude of the system voltage applied to the input of the device for modifying the phase gating angle.

The invention claimed is:

1. A circuit for producing a control signal for the purpose of dimming at least one lamp, the circuit comprising:
    a device for receiving an input voltage and a dimming input value, and for providing an output voltage having a modified phase gating angle, wherein the device is operable to modify the phase gating angle in dependence upon the dimming input value;
    a rectifier circuit for receiving the output voltage from the device and for providing a rectified version of the output voltage;
    a control output at which a control signal is provided;
    an amplitude detection device coupled to the rectifier circuit, wherein the amplitude detection device is operable to detect the amplitude of the input voltage and to provide a predeterminable voltage in dependence upon the amplitude of the input voltage; and
    a comparison device coupled to the rectifier circuit, the amplitude detection device, and the control output, wherein the comparison device is operable to:
      (i) compare the rectified output voltage with the predeterminable voltage; and
      (ii) provide the control signal in dependence upon the phase gating angle of the output voltage, wherein the control signal has an amplitude that is substantially independent of the magnitude of the input voltage.

2. The circuit of claim 1, wherein the comparison device comprises a subtraction circuit for receiving the rectified output voltage and the predeterminable voltage, wherein the subtraction circuit is operable to provide a subtraction voltage that is representative of a difference between the rectified output voltage and the predeterminable voltage.

3. The circuit of claim 2, wherein the comparison device further comprises a toggle circuit coupled between the subtraction circuit and the control output, wherein the toggle circuit is operable to receive the subtraction voltage and to provide the control signal such that:
    (i) if the difference between the rectified output voltage and the predeterminable voltage is positive, the control signal is a nonzero positive voltage; and
    (ii) if the difference between the rectified output voltage and the predeterminable voltage is negative, the control signal has a magnitude that is approximately zero.

4. The circuit of claim 1, wherein the amplitude detection device comprises:
    a resistive voltage divider comprising at least a first resistor and a second resistor;
    a diode coupled to a junction between the first resistor and the second resistor; and
    a holding element coupled to the diode.

5. The circuit of claim 4, wherein the holding element comprises a parallel combination of a capacitor and a third resistor.

6. A method for producing a control signal for the purpose of dimming at least one lamp, the method comprising the steps of:
  receiving an input voltage and a dimming input value;
  providing an output voltage having a modified phase gating angle, the modified phase gating angle being set in dependence upon the dimming input value;
  rectifying the output voltage;
  detecting the amplitude of the input voltage;
  providing a predeterminable voltage in dependence upon the detected amplitude of the input voltage;
  comparing the rectified output voltage with the predeterminable voltage; and
  setting the control signal in dependence upon the phase gating angle of the output voltage, wherein the control signal has an amplitude that is substantially independent of the magnitude of the output voltage.

7. The method of claim 6, wherein the step of comparing the rectified output voltage with the predeterminable voltage includes subtracting the predeterminable voltage from the rectified output voltage.

8. The method of claim 7, wherein the step of providing the control signal includes setting the control signal such that:
  (i) if the difference between the rectified output voltage and the predeterminable voltage is positive, the control signal is a nonzero positive voltage; and
  (ii) if the difference between the rectified output voltage and the predeterminable voltage is negative, the control signal has a magnitude that is approximately zero.

* * * * *